US 6,549,255 B2

(12) United States Patent
Stebler et al.

(10) Patent No.: US 6,549,255 B2
(45) Date of Patent: Apr. 15, 2003

(54) LIQUID CRYSTAL DEVICE AND A METHOD FOR PRODUCING IT HAVING DIRECTLY CONTROLLABLE DYNAMIC SURFACE-DIRECTOR ALIGNMENT LAYER

(75) Inventors: Bengt Stebler, Göteborg (SE); Dietrich Demus, Halle (DE); Torbjörn Lagerwall, Göteborg (SE); Lachezar Komitov, Göteborg (SE)

(73) Assignee: Ecsibeo AB, Göteborg (SE)

( * ) Notice: Subject to any disclaimer, the term of this patent is extended or adjusted under 35 U.S.C. 154(b) by 0 days.

(21) Appl. No.: 09/754,189

(22) Filed: Jan. 5, 2001

(65) Prior Publication Data

US 2001/0005249 A1 Jun. 28, 2001

Related U.S. Application Data

(63) Continuation of application No. PCT/SE98/02449, filed on Dec. 28, 1998.

(30) Foreign Application Priority Data

Jul. 8, 1998 (SE) .............................. 9802448

(51) Int. Cl.⁷ ...................... G02F 1/3337; G02F 1/1343
(52) U.S. Cl. ................... 349/127; 349/123; 349/141
(58) Field of Search ................. 349/127, 128, 349/123, 124, 130, 141, 143

(56) References Cited

U.S. PATENT DOCUMENTS

| 4,813,767 A | * | 3/1989 | Clark et al. ................ 350/341 |
| 5,039,208 A | * | 8/1991 | Ohnishi et al. ............. 359/100 |
| 5,078,477 A | * | 1/1992 | Jono et al. .................. 359/91 |
| 5,159,475 A | * | 10/1992 | Fergason et al. ............ 359/38 |
| 5,214,523 A | * | 5/1993 | Nito et al. .................. 359/100 |
| 5,239,398 A | * | 8/1993 | Yanagisawa et al. ......... 359/76 |
| 5,256,456 A | * | 10/1993 | Ogawa ........................ 428/1 |
| 5,512,336 A | | 4/1996 | Yamahara .................... 428/1 |
| 5,514,426 A | * | 5/1996 | Eguchi ........................ 428/1 |
| 5,528,394 A | * | 6/1996 | Yeoh et al. ................. 359/56 |
| 5,532,854 A | * | 7/1996 | Fergason .................... 359/93 |
| 5,608,556 A | | 3/1997 | Koma ....................... 349/143 |
| 5,784,137 A | * | 7/1998 | Shiomi et al. ............... 349/88 |
| 6,219,019 B1 | * | 4/2001 | Hasegawa et al. ............ 345/96 |
| 6,266,115 B1 | * | 7/2001 | Fujikawa et al. ............ 349/133 |

FOREIGN PATENT DOCUMENTS

| JP | 10-096926 | 4/1998 |
| JP | 10-133213 | 5/1998 |
| WO | 96/31876 | 10/1996 |

OTHER PUBLICATIONS

Copy of International Search Report dated Apr. 15, 1999.
Copy of International Preliminary Examination Report dated Nov. 22, 2000.

* cited by examiner

Primary Examiner—Toan Ton
Assistant Examiner—Mike Qi
(74) Attorney, Agent, or Firm—Burns, Doane, Swecker & Mathis, LLP

(57) ABSTRACT

An electrooptic device (2), and the methods for manufacturing, including a liquid crystal material (12) disposed between electroded flat glass or polymer substrates (4, 20) which have been precoated with a e.g. a chiral smectic surface layer (10, 14) in such way that the surface layer is able to mediate switching of the liquid crystal (12) between different optical states. The chiral smectic surface layer can be a polymer, oligomer or monomer liquid crystal with paraelectric, ferroelectric, ferrielectric or antiferroelectric response, which is insoluble in the liquid crystal used for the bulk (12) between the electroded substrates (4, 20). the switchable surface director enforces a certain orientation of the optic axis in the bulk liquid crystal (12), which can be a conventional non-chiral or chiral nematic or smectic in a twisted or non-twisted configuration.

46 Claims, 10 Drawing Sheets

LIQUID CRYSTAL DEVICE AND A METHOD FOR PRODUCING IT HAVING DIRECTLY CONTROLLABLE DYNAMIC SURFACE-DIRECTOR ALIGNMENT LAYER

This is a Continuation of International Application No. PCT/SE98/02449, filed Dec. 28, 1998 that designates the United States of America and was published under PCT Article 21(2) in English and claims priority for the filing of Application No. 9802448-2 in Sweden on Jul. 8, 1998.

TECHNICAL FIELD

The present invention generally relates to the field of liquid crystals. More specifically, the present invention relates to a liquid crystal device including a liquid crystal bulk layer, and a dynamic surface alignment layer interacting with the bulk layer for obtaining a preferred orientation of the surface director of the bulk layer. The invention also relates to a method for producing a liquid crystal device including such a dynamic surface alignment layer. Furthermore, the present invention relates to a method for accomplishing an in-plane switching in a liquid crystal bulk layer of a liquid crystal device.

Technical background

The operation of almost all liquid crystal devices is based on a direct coupling between, on the one hand, an electric field applied in a perpendicular direction across a liquid crystal bulk layer within the device and, on the other hand, an induced polarization of the liquid crystal layer (in dielectric or paraelectric liquid crystals) or a spontaneous polarisation of the liquid crystal layer (in ferroelectric crystals). As a direct result of said direct coupling with the applied electric field, the orientation of the liquid crystal molecules within the bulk layer is changed, which in its turn results in an optical response so the device due to birefringent properties of the liquid crystal. The applied electric field will normally interact not only with the crystal molecules within the volume, but also with those molecules of the bulk layer that are located at the surface of the bulk layer. Typically, such interaction between the electric field and he surface molecules of the bulk layer may be less strong due to surface constraints.

There exists a number of different types of liquid crystal displays using liquid crystal devices, especially (1) Dynamic scattering displays; (2) Displays using deformation of homeotropically aligned nematics; (3) Schadt-Helfrich displays; (4) Supertwist-displays; (5) In-plane switching displays controlled by electric fields oriented in parallel with the substrates; and (6) Surface Stabilized Ferroelectric Liquid Crystal Displays (SSFLC Displays) and Displays with antiferroelectric liquid crystals.

For modern applications, a liquid crystal display should present several important properties, such as a low power consumption, a low threshold voltage, a steep electro-optical characteristic or bistability, a low viewing angle dependence of the contrast, short switching times, a high contrast, brightness, etc.

Today, some liquid crystal displays are advantageous concerning some of the above-mentioned desired properties, but there exists no ideal display which is optimized concerning all of the important properties.

Conventional nematic displays with a dielectric coupling to the electric field are usually slow, and nearly all suffer from non-satisfactory angular dependence of the contrast due to the out-of-plane switching of the liquid crystal molecules. The term "out-of-plane switching" refers to the fact that the nematic liquid crystal molecules, when subjected to an external electric field, typically will tilt in relation to the plane in which the molecules normally are located in.

The dynamic scattering displays relies on strong movements of the molecules and inherently need relatively high electric field for switching and therefore, this display type is seldom used anymore. Displays with deformation of homeotropically aligned nematics as well as Schadt-Helfrich displays have a strong viewing angle dependence of the optical contrast, and the latter also possesses a low steepness of the electro-optical characteristic. Supertwist displays (twist angles of e.g. 270°) have an improved steepness of the electro-optical characteristic, but they present longer switching times and not yet satisfying viewing angle dependence of the optical contrast.

In contrast to the use of fields which are oriented perpendicular to the confining substrates, displays of the in-plane-switching type are controlled by electric fields oriented in parallel—not perpendicular—with the substrates. These displays possess very small dependence of the optical contrast from the viewing angle, but the brightness and switching times are not satisfying. A specific disadvantage of this display type is the requirement for an in-plane applied electric field which causes manufacturing problems.

Next, the surface stabilized ferroelectric liquid crystal devices (SSFLCs) will by considered, but first a short description of the nature of smectic liquid crystals will be given for a better understanding of the SSFLCs.

In a smectic liquid crystal, the molecules are arranged in adjacent smectic layers. Smectic A phase and smectic C phase are the two most important representatives of these "layered" or smectic liquid crystals. In the C phase, the molecules are inclinded with an angle $\beta$ (typically in the order of 22, 5°) with respect to the smectic layer normal, whereas in the A phase the molecules are perpendicular ($\beta=0°$) to the smectic layers, i.e. directed along the smectic layer normal. Furthermore, a smectic liquid crystal can be non-chiral (e.g. A or C) or chiral (e.g. A* and C*), where the term chiral, means lack of mirror symmetry. It should be noted that the term "chiral" does not refer to the occurrence of a twisted or helical molecular arrangement that may or may not appear as a secondary effect as a result of the medium's chirality.

A chiral smectic liquid crystal, such as C*, possesses a director that rotates in a cone in going from one smectic layer to the next. The apex angle $\theta=2\beta$ of the cone may typically be in the order of 45°. Thereby, a helix texture is formed across the layers with the helix axis being perpendicular to the smectic layers and parallel to the axis of said cone. However, the local polarisation which is coupled to the director will then also turn around in a helical fashion, with the same period or pitch. Such a helical structure of the local polarisation means that the local polarisation is self-cancelling, i.e. the bulk liquid crystal will present no macroscopic polarisation.

Now, if an electric field is applied parallel to the smectic layers in the helical smectic C* bulk state, the electric field will couple to the permanent dipoles and align them with the field direction. In other words, the applied field will unwind the helix and create an induced macroscopic polarisation of the bulk liquid crystal.

In a so-called SSFLC device, a chiral smectic liquid crystal is used (e.g. C*), but the above-mentioned helix is suppressed by the confining substrate surfaces and thereby not present. This is accomplished (i) by arranging the smectic layers non-parallel with the confining planes or substrates of the device (bookshelf or quasi-bookshelf structure), and (ii) by making the thickness of the smectic liquid crystal layer perpendicular to the substrates so small (in the order of microns) that the interaction of the liquid crystal molecules with the substrate surfaces produces a liquid crystal texture in which there is no longer any helical arrangement of the director within the cell. Instead, the liquid crystal molecules align in a predetermined direction, e.g. parallel, to the substrate despite the fact that a chiral material is used. Specifically, the director lying parallel with the substrates forms an angle (e.g. 22, 5°) to the smectic layer normal. Since the uniform surface conditions at the boundaries are in conflict with the helical bulk condition and, therefore, will quench the helix, the helix will be elastically untwisted by the boundaries when the cell thickness is chosen below a certain value. The result is what is called the surface-stabilized smectic C* state, presenting a non-zero macroscopic polarisation.

The material such as C* used in this device is in the ferroelectric phase, which means that, in the absence of an electric field, it presents a permanent polarisation along the smectic layers, i.e. perpendicular to the long molecule axis. Thereby, the director can be "digitally" switched between to states by reversal of the electric field applied in a direction perpendicular to the substrates. Such a cell is called a surface stabilized ferroelectric liquid crystal device (SSFLC device). An important feature is that the "flipp-flopp" mechanism ("the Goldstone effect"), which could also be bistable, is much faster than the rather slow dielectric mechanism that switches conventional LC materials having no permanent polarization, such as a conventional twisted nematic display.

In this context, it could be noted that the above-mentioned smectic layers are generally slightly tilted relative to the confining surfaces. Moreover, the may form a chevron structure rather than a bookshelf structure.

As an alternative Do using ferroelectric materials, the liquid crystal material can be an the so-called anti-ferroelectrical phase (AFLC), which means that in the absence of an electric field, the directors in adjacent smectic layers possess an opposite tilt. In a AFLC display, the polarizers are set parallel and perpendicular to the smectic layers. At E=0, a dark state is obtained, whereas +E and −E both give the same bright state. Thus, the AFLCs present a "three-state switching", whereas the SSFLCs present a "two-state switching" which could be bistable as well.

Drawbacks of the surface stabilized ferroelectric liquid crystal displays (SSFLCD's) and the antiferroelectric liquid crystal displays include difficulties in orienting the smectic phase and maintaining the orientation of these phases. Also, the power consumption is relatively high. Another drawback is that the thickness of the liquid crystal layer must be limited, usually to about 2 $\mu$m, in order to obtain the aimed-at coupling between an applied electric field and the spontaneous polarisation. This requirement for small thickness of FLC devices make their production complicated, delicate and expensive.

In the conventional liquid crystal devices discussed above, the desirable alignment of the liquid crystal within the bulk is achieved by appropriate treatment of the confining solid surfaces like coating with inorganic or organic layers as well as buffing (rubbing). In the absence of external fields, the initial liquid crystal alignment is defined by surface-liquid crystal interactions. Via steric interactions, the direction of the surface molecules will induce an orientation of the molecules within the bulk. For instance, near the substrate surface the director is constrained to point in a certain direction, such as perpendicular to the surface (homeotropic alignment) or parallel with the surface (planar alignment). Since the liquid crystal materials are strongly birefringent any change in their alignment will cause a certain change in their visible optical properties as seen between suitable polarizers.

In the prior art, there are in principle the following two different ways (1) and (2) for accomplishing a new molecule orientation different from the initial molecule alignment in order to change the optical properties:

(1) The first known technique for changing the molecule orientation is to apply an external field, such as an electric field over the entire liquid crystal bulk layer. Due to the above-mentioned direct coupling between the electric field and some of the liquid crystal material parameters within the bulk, the field directly interacts with the liquid crystal and changes the molecule alignment if the direction caused by the interaction differs from the preferred direction of the initial alignment. In some applications, the molecules near the surfaces are not very free to orient with the electric field, but the "bulk molecules" more remote from the surfaces are fairly free to change its orientation.

(2) The second known technique for changing the orientation of the liquid crystal layer molecules is to design one of the confining alignment layers as a photo-controlled "command surface". When subjected to UV light, this command surface changes its aligning properties and thus changes the direction of the initial alignment of the liquid crystal interfacing with the alignment layer. This technique has been described by K. Ichimura et al. in two articles in Liquid Crystals, 1966, Vol. 20, No. 2, cages 423–435 and 161–169, respectively, and also in an Article entitled "Photocontrol of liquid crystal alignment by "command surfaces" "in the document" Photoreactive Materials for Ultrahigh Density Optical Memory", published by Institute of Advanced Material Study, Kyushu University, Japan.

More specifically, an azobenzene monolayer is deposited onto inner substrate surfaces of an LC cell including a nematic LC bulk layer. Conformational changes of the molecules in the alignment layer cause in its turn a change of the alignment of the nematic liquid crystal molecules. Specifically, the azobenzene molecules change their conformation from the "trans state" to the "cis state" when irradiated with UV light. Photosensitive molecules, e.g. azocompounds, are anchored by the aid of triethoxysilyl groups at the substrate surfaces and are subjected to trans/cis-photoisomerization. The transisomer impose a homeotropic orientation of the nematic (nematic molecules perpendicular to the substrate), whereas the cis-isomer gives a planar one (nematic molecules parallel to the substrate). The photoisomerisation process take place when radiating the sample with UV light. The relaxation to the initial alignment is obtained by radiating the sample with white light or simply by heating it.

A drawback of using photocontrolled command layers in order to change the liquid crystal alignment is the slow switching speed between the two states. Especially, the transition from planar (cis) to homeotropic (trans) is a relatively slow process. Another drawback is that the life time of the device is reduced due to UV-light degradation. Furthermore, it can be used only for controlling nematic liquid crystals.

Therefore, today's LC electrooptical displays are controlled not by light but by the use of external electric fields for changing the optical Properties of the bulk liquid crystal filled within the cell. Directional changes of the molecules can be made fast only by means of electric fields. The electric field directly interacts with the bulk liquid crystal and changes the orientation or alignment thereof, thereby changing properties of the display, such as light transparency, light absorption at different wavelengths, light scattering, birefringence, optical activity, circular dichroism, etc.

In view of the above-mentioned desired properties of a liquid crystal device, and the above-mentioned different drawbacks of the known displays, a general object of the present invention is to accomplish an improved liquid crystal display and a method for manufacturing such a display.

SUMMARY OF THE INVENTION

According to a first aspect of the invention (claim 1) there is provided a liquid crystal device presenting a dynamic surface alignment layer directly controllable by an electric field.

According to a second aspect of the invention (claim 36) there is provided a method for producing a liquid crystal device presenting a dynamic surface alignment layer directly controllable by an electric field.

According to a third aspect of the invention (claim 44) there is provided a method for accomplishing an induced in-plane switching in a liquid crystal bulk layer.

According to a fourth aspect of the invention (claim 45) there is provided a use of a liquid crystal material for producing dynamic alignment layer in a liquid crystal device.

Preferred and alternative embodiments of the invention are set out in the dependent claims.

According to the invention, the orientation of the surface molecules of the liquid crystal bulk layer are controlled by accomplishing an orientational change in one or two adjacent dynamic alignment layers. This orientational change in the dynamic alignment layer is accomplished by applying an electric field over the dynamic alignment layer in order to control the same. Normally, the electric field would also be applied across the LC bulk layer in addition to the dynamic alignment layer(s), but as far as the basic principle of the invention is concerned, any presence of the electric field over the LC bulk layer is not of primary importance, although in certain applications such presence may be useful.

In the present description of the inventive principle, the change of the dynamic alignment layer in response to the electric field is referred to as the "primary surface switching". The primary surface switching results in its turn, via elastic forces (steric coupling), in a switching of the preferred molecule direction within the bulk volume of the liquid crystal material confined between the substrates. This secondary switching may be referred to as the "induced bulk switching". This induced bulk switching is an in-plane switching. Thus, the change of the dynamic alignment layer causes a change of the surface molecules which are aligned by the alignment layer, and this change of the surface molecules accomplishes in its turn the induced bulk switching.

In a preferred embodiment of the invention, a chiral smectic liquid crystal material is used in order to form the electrically controllable dynamic alignment layer. Thus, according to the invention, it is possible to control or align a first liquid crystal layer (the bulk layer) by an electrically controlled, adjacent second liquid crystal layer (the dynamic alignment layer). Especially, this can be done without any need for direct coupling between the electric field and the liquid crystal material used for the bulk layer.

The above described inventive principle, as defined in the independent claims, gives rise to a number of very important and useful advantages over the prior-art liquid crystal displays. Especially, the following advantages 1–7 could be mentioned:

1. As a general advantage, tie invention allows fast switching times due to the use of electric fields for switching control.
2. The invention does not require any use of light, such as UV light, for accomplishing the switching function.
3. An important advantage of the invention is that is makes it possible to extend the advantages of in-plane molecule switching typical of e.g. SSFLCs, even including bistability, to conventional liquid crystal structures. As an example, a dynamic alignment layer according to the invention can be produced as a thin layer of smectic C* presenting a bistable, direct ferroelectric response to the applied electric field. A reversal of the field direction will result in a very quick response of the smectic C* layer. This the primary surface switching in response to the field reversal will be essentially as fast as the response of a conventional SSFLC. Due to (i) a coupling between the alignment layer and the surface molecules of the bulk layer, and (ii) a coupling between the surface molecules of the bulk layer and the molecules further into the bulk volume, the induced in-plane switching will be almost as fast as the primary surface switching. In other words, the invention makes it possible to electrically control a liquid crystal bulk layer in a very fast manner, without any specific requirement on the liquid crystal material, the thickness, the electrical response, etc of the bulk layer.
4. Many different types of liquid crystal materials can be used to implement the dynamic alignment layer.
5. Many different types of liquid crystal materials can be used to implement the bulk liquid crystal layer, such as a conventional non-chiral or chiral nematic or smectic in a twisted or non-twisted configuration.
6. The principle puts very few demands on the conventional liquid crystal and requires only a conventional and simple electrode structure.
7. The invention can be used to implement grey scale features. This can be performed by accomplishing a "two-step effect", if the liquid crystal material of the bulk layer also presents a direct response to the applied electric field. As an example, one could have the bulk layer formed by a nematic liquid crystal having a small positive dielectric anisotropy, and having a threshold voltage for dielectric switching above that of the dynamic alignment layer. Now, when the electric field strength is increased, the first switching (the primary surface switching) occurs e.g. when the voltage reaches a first threshold voltage for dynamic alignment layer. At this point, there is still no direct electrical coupling between the electric field and the bulk molecules. However, there will be an induced in-plane switching of the bulk molecules.

This is the first step of the above-mentioned two-step effect. When increasing the field strength further, the voltage will exceed the threshold for dielectric switching within the bulk layer, leading to a homeotropic out-of-plane orientation of the nematic molecules. By the use of suitably orientated polarizers, the first step (induced in-plane switching) may extinguish light partly through the device, whereas the second step (the out-of-plane switching) may result I an essentially complete light blocking effect.

The aforementioned and other embodiments and advantages of the invention can be seen from the claims and the description hereinbelow of some embodiments of the inventive device and the manufacturing thereof.

DESCRIPTION OF THE DRAWINGS

FIG. 1 illustrates schematic drawings Of liquid crystal devices according to the invention, wherein FIG. 1a is double-sided embodiment, whereas

DESCRIPTION OF EMBODIMENTS OF THE INVENTION

Figure 1A:
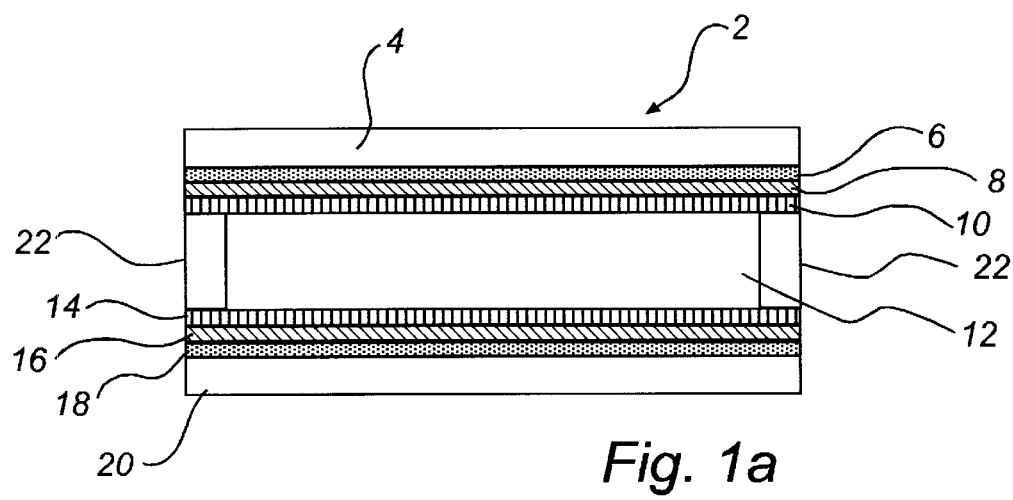
Figure 1B:
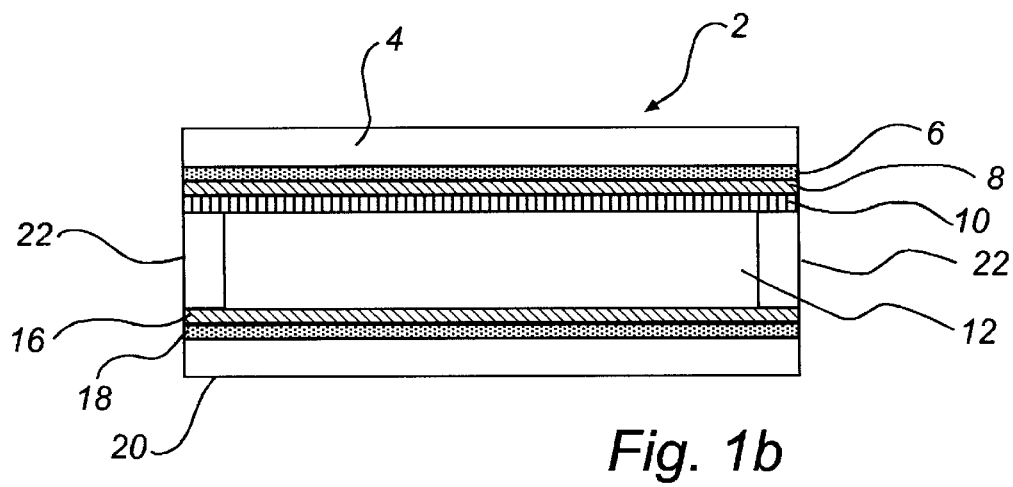
FIG. 1b is a single-sided embodiment.

Referring now to FIG. 1a, there is schematically illustrated a liquid crystal cell 2 including dynamic surface alignment layers according to the invention. Starting from the top, the cell 2 includes the following components: a first glass or polymer substrate 4, a first ITO-film 6 (indium tin oxide film), a first passive surface alignment layer 8, a first dynamic surface alignment layer 10, a sealed liquid crystal bulk layer 12, a second dynamic surface alignment layer 14, a second passive surface alignment layer 16, a second ITO-film 18 and a second glass or polymer substrate 20. Reference numeral 22 represents spacers holding the glass substrates 4 and 20 at a fixed distance from each other. The cell illustrated in FIG. 1a is a double-sided embodiment of the invention, including two dynamic surface alignment layers 10 and 16. The cell illustrated in FIG. 1b is a single-sided embodiment including only one dynamic surface alignment layer 10.

EXAMPLE 1

Method for Preparation

The following example describes a method for preparation of a chiral smectic surfaces forming e.g. the first dynamic alignment layer 10 in FIG. 1a.

The inner surface of the glass substrate 4 is first covered with a transparent, conductive ITO film 6 and thereafter with a passive alignment layer 8 of buffed SiOx, evaporated at normal incidence. As well known, this passive alignment layer 8 gives a unidirectional planar alignment of most liquid crystal materials. In order to manufacture the dynamic surface alignment layer 10, the passive SiOx alignment layer 8 is now precoated with a thin layer of mixture of photoreactive liquid crystal. monomers A1b/A2c (20/80% wt) and photoinitiator (usually added in a very small amount) by spinning a delute solution of this mixture in chloroform (about 10% wt). The structures of the monomers are the following:

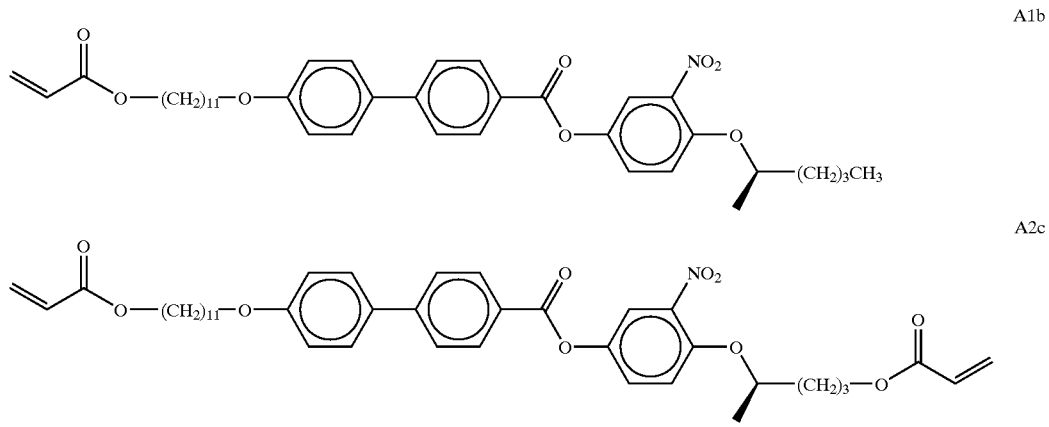

As can be seen, A1b and A2c are monofunctional and bi-functional monomers, respectively, and both are chiral. After evaporation of the solvent, the glass substrate 4 is inserted in a hot stage at temperature 37° C. at which the coating is in the Sm A* phase which allows a better alignment of this coating. Then, the sample is illuminated by UV-light. A polymeric network is formed due to photopolymeriztion process where the bifunctional molecules are crosslinked with both ends, whereas the mono-functional molecules have one free end to move and thus being switchable by an applied electric field. After the exposure, the temperature of the sample is elevated substantially (of about 150° C.) in order to accomplish the polymerization process. The adhesion of the A1b/A2c polymeric network to the previously coated class substrate 4 is rather good. Finally, as a precautious step, the glass substrate 4 is washed with solvent as acetone or chloroform, in order to avoid the inclusion of any non-polymerized quantity of the surface deposited material in the bulk liquid crystal 12 confined between the cell substrates 4 and 20. The A1b/A2c network seems to be well attached to the substrate surface and to be insoluble in the liquid crystal 12.

EXAMPLE 2

Method for Preparation

The following example also describes a method for preparation of a chiral smectic surface forming e.g. the first dynamic alignment layers 10 in FIG. 1a. The conductive ITO film 6 of glass substrate 4 is covered by a passive alignment layer 9 of photochromic material. This material is of the side-on type of attachment of azobenzene mieties at the ortho- or metha-position anchored onto silica surface through silylation, for instance. The molecular structure of such a material could be the following:

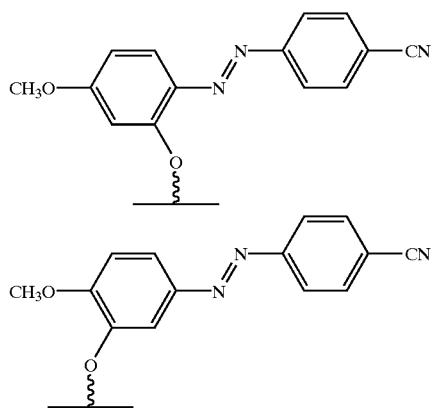

Then, the substrate is exposed to a linearly polarized UV-light which results in, as well known, a uniform planar alignment of the liquid crystal molecules in contact. Thereafter, the passive alignment layer is precoated by a photoreactive monomer A1b according to the procedure described in Example 1. After the polymeriztion, the molecules of this material seems to be uniformly oriented, well anchored to the passive alignment layer ant insoluble in the low molar mass liquid crystal material filling the cell.

EXAMPLE 3

Method for Preparation

In this example, the photoreactive monomer mixture A1b/A2c is mixed with a dichroic azo-dye or another photochromic material, which molecules can be aligned by a linearly polarized light. The wavelength used for the light controlled alignment of the dye molecules, and thus the alignment of the liquid crystal molecules in the first dynamic alignment layer 10, may differ from the wavelength of the light resulting in the photopolymerization of the photoreactive monomer mixture. Thus, the molecules of the dynamic alignment layers 10 will be first unidirectionally aligned by the linearly polarized light, and then photopolymerized.
In-plane Switching of Bulk Liquid Crystals Some examples illustrating the induced in-plane switching according to the inventive principle will now be described.

The chiral surface mediated device (CSMD) used in the following examples consisted of two parallel electroded glass substrates 4 and 20 with a micron-size gap (spacers 22) between them. Both substrates of the cell 2 where covered with a chiral smectic layer 10 and 14, respectively, according to the above described procedures. The structure of the experimental devices were as illustrated in FIGS. 1a and 1b.

Figure 2:
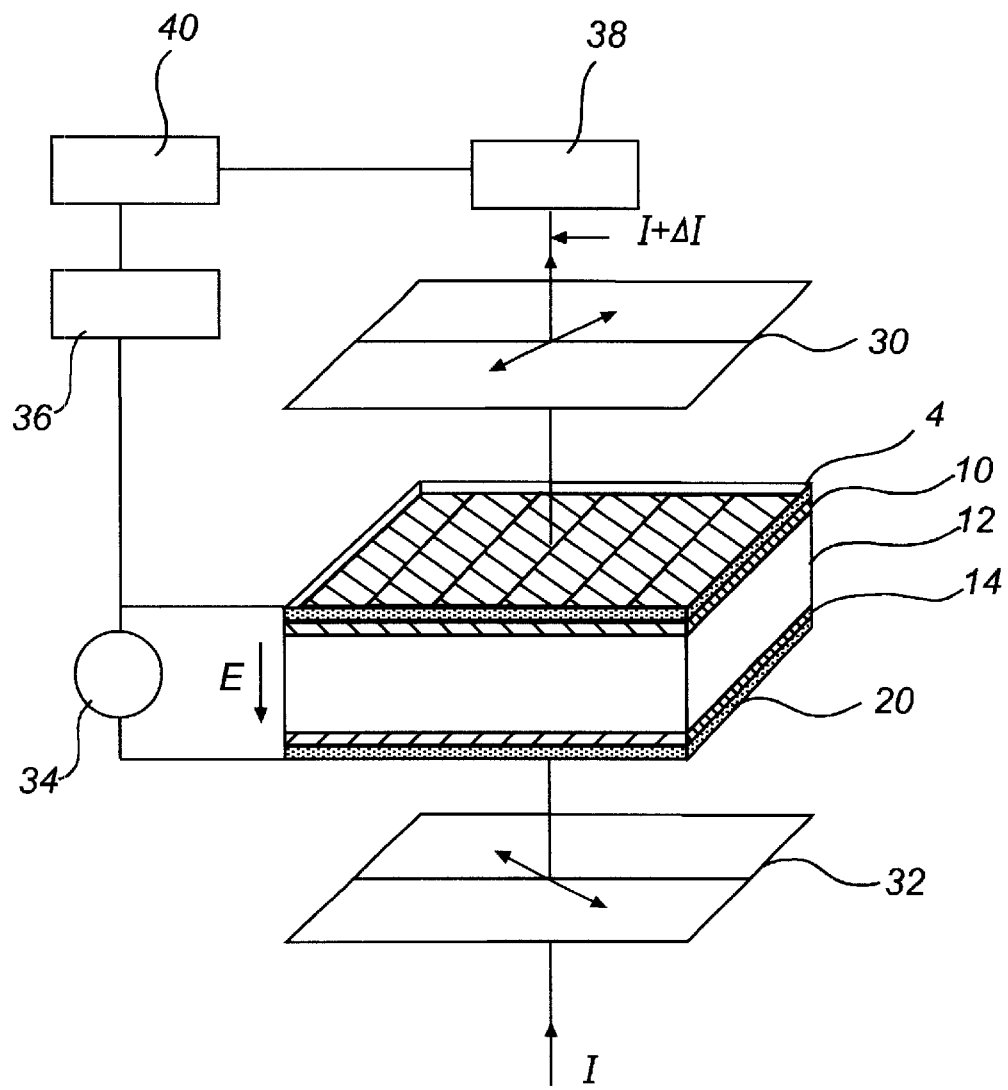
FIG. 2 illustrates an experimental set-up for detecting the electrooptical response of the devices

The electro-optical response was detected by means of the set-up depicted schematically in FIG. 2.

The sample 2 is inserted in between two crossed polarizers (analyzer 30 and polarizer 32). The sample 2 is oriented by its optic axis at an angle of 22, 5 degrees with respect to the transmission direction of the one of the polarizers for a maximum light modulation of the transmitted light when an electric field E is applied to the sample by means of a voltage supply 34. Of Necessary, this voltage can be amplified by a differential voltage multiplier 36. The transmitted light intensity I is detected by a detector 38. An oscilloscope 40 is connected to the voltage supply 34 and to the light detector for visualising the electro-optic characteristics of the sample 2 and the applied voltage.

EXAMPLE 4

In-plane Switching in Bulk Layer

The two inner surfaces of the device 2 where precoated with chiral smectic layers according to Example 1 or Example 2. For producing the bulk layer 12, the device was filled with the non-chiral liquid crystal material Hoechst 908, possessing the following phase sequence:

C 10° C. smC 63° C. smA 64° C. I

Figure 3:
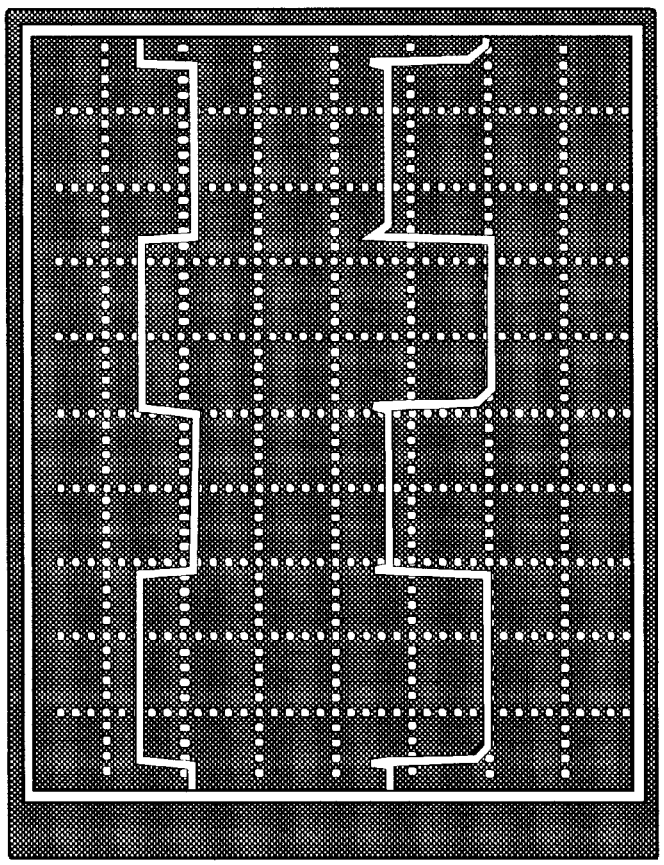
FIG. 3 illustrates a detected electrooptical response obtained by the experimental set-up in FIG. 2.
Figure 3:
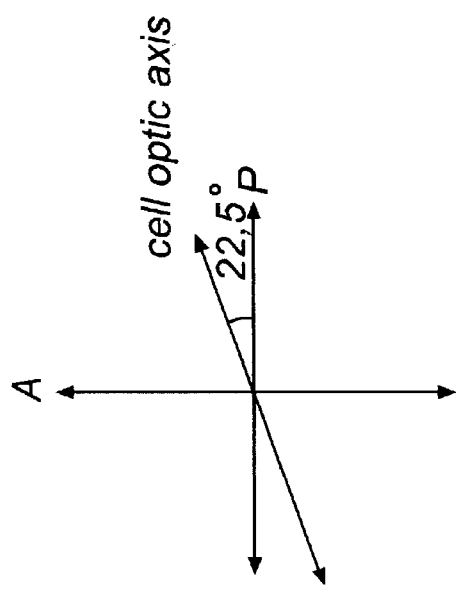

The cell 2 was inserted between crossed polarizers 30 and 32 with the optic axis oriented at 22.5° with respect to the one of the polarizers. It should be noted that a "conventional" prior-art cell filled with this liquid crystal material, but having no dynamic surface alignment layers would exhibit only a dielectric response to an applied electric field. However, in the inventive cell 2 with the inner surfaces precoated with chiral smectic layers 10 and 14. The inventors found a distinct switching in the smectic C phase on applying an electric field of about $E=5V/\mu L$ to the cell of 14 $\mu m$ thickness. The response is depicted in FIG. 3. As seen, it is linear and the optic axis of the sample has been proved to switch in the plane of the sample 2 simply by rotating the sample 2 at 45° which then results in a 180° phase shift of the response.

Figure 4:
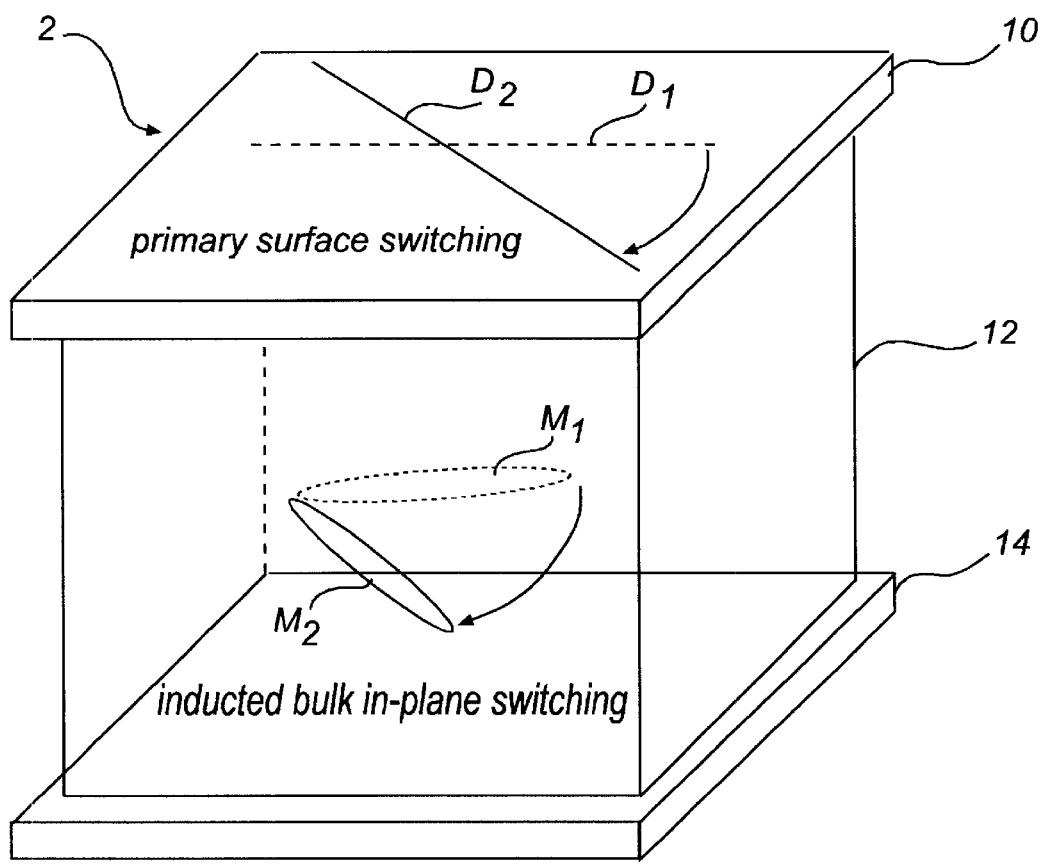
FIG. 4 is a schematic drawing illustrating an induced in-plane bulk switching of an liquid crystal device according to the invention.

Reference is now made to FIG. 4. According to the inventive principle, the switching process within the bulk layer 12 of the cell 2 is initiated by the chiral smectic layers 10 and 14 covering the inner substrate surfaces. The direction of alignment of the molecules of the surface layers 10 and 14 can be changed by applying an electric field E across the cell (primary surface switching). This directional change is schematically illustrated in FIG. 4 with a dotted line D1 and a solid line D2.

The primary surface switching (D1→D2) will in its turn result, via elastic forces, in a switching of the preferred direction of alignment of the molecules within the volume of the liquid crystal material 12 confined between the substrates 4 and 20. This induced bulk switching is schematically illustrated in FIG. 4 by a molecule M1 (dotted line) switching to a new direction M2 (solid line). The induced bulk switching of the optic axis is in fact an in-plane switching, i.e. a switch taking place in a plane parallel with the substrates 4 and 20. Depending on the sign of the dielectric anisotropy in the bulk material 12, the dielectric coupling can stabilize (Dε<0) or destabilize (Dε>0) the in-plane switching of the molecules in the liquid crystal volume 12.

EXAMPLE 5

In-plane Switching in Bulk Layer

In a further example, use was made of the device according to Example 1, including the racemic liquid crystal mixture WILC 48 (Hoechst) with a phase sequence:

SmC 48° C. SmA 57° C. I

The same type of electro-optical response in the smectic C phase as the one given in Example 3 was detected in a cell of 2 μm thickness on applying an electric field of E=2,3 V/μm.

EXAMPLE 6

In-plane Switching in Bulk Layer

Figure 5:
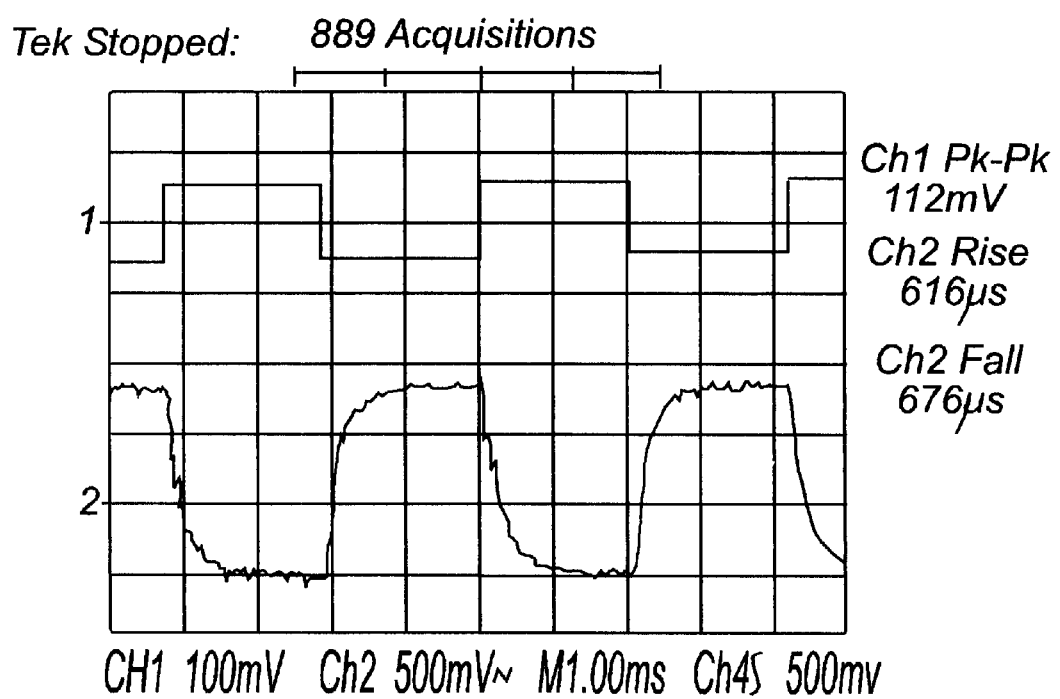
FIG. 5 illustrates another detected electrooptical response obtained by the experimental set-up in FIG. 2.

A cell was prepared according to Example 2. The liquid crystal material 12 was the neimatic mixture ZLI 2585 (Merck), with a negative dielectric anisotropy (Dε<0) A liquid crystal material with Dε<0 was chosen in order to stabilize the planar alignment of the liquid crystal molecules by means of the dielectric coupling. The liquid crystal was sucked under vacuum into the cell in the isotropic phase and was allowed to slowly cool down to room temperature. The detected electro-optical response obtained for a 2 μm thick cell on applying an electric field of E≈3V/μm is depicted in FIG. 5. It is a result of in-plane molecule switching (according to FIG. 4) of the sample optic axis and it has also a linear character and a response time in the microsecond region.

EXAMPLE 7

Grey Scale

Figure 6:
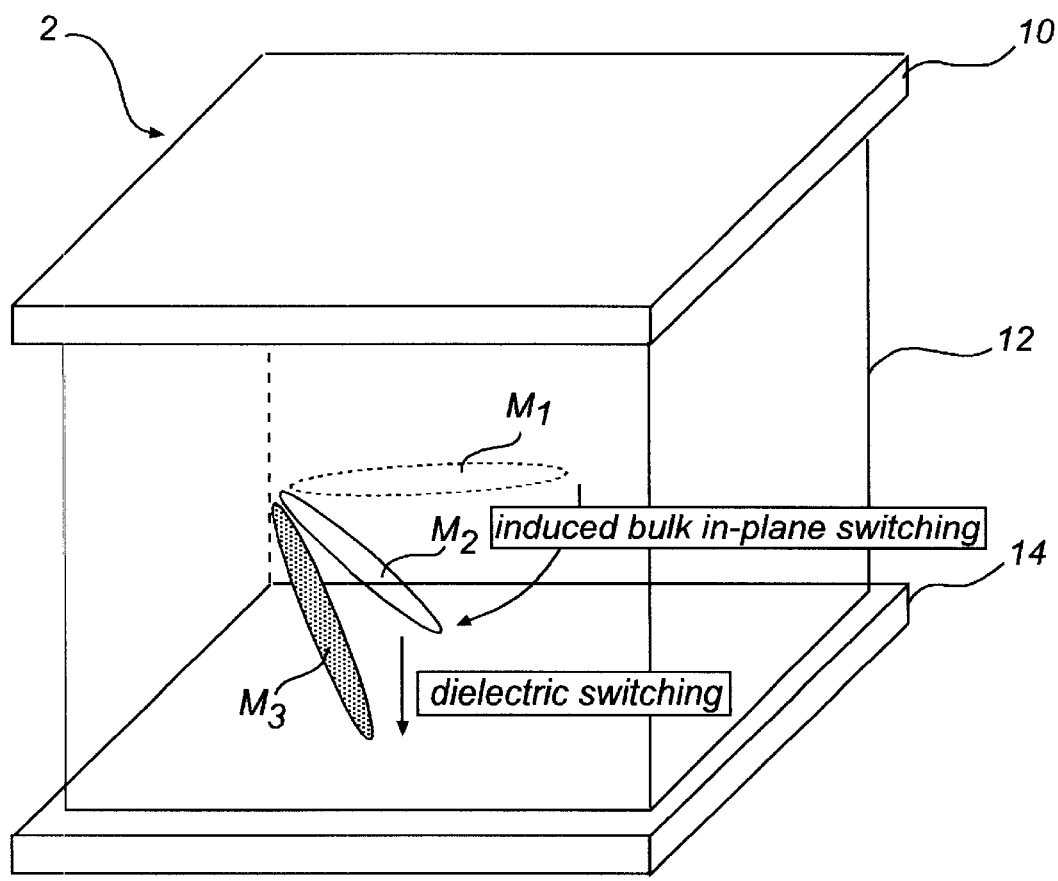
FIG. 6 is a schematic drawing illustrating an induced in-plane bulk switching of an liquid crystal device according to the invention, in combination with a dielectric out-of plane switching, resulting in a grey-scale effect.

Reference is now made to FIG. 6, in order to illustrate how the invention can be used for implementing a grey-scale function.

Figure 7:
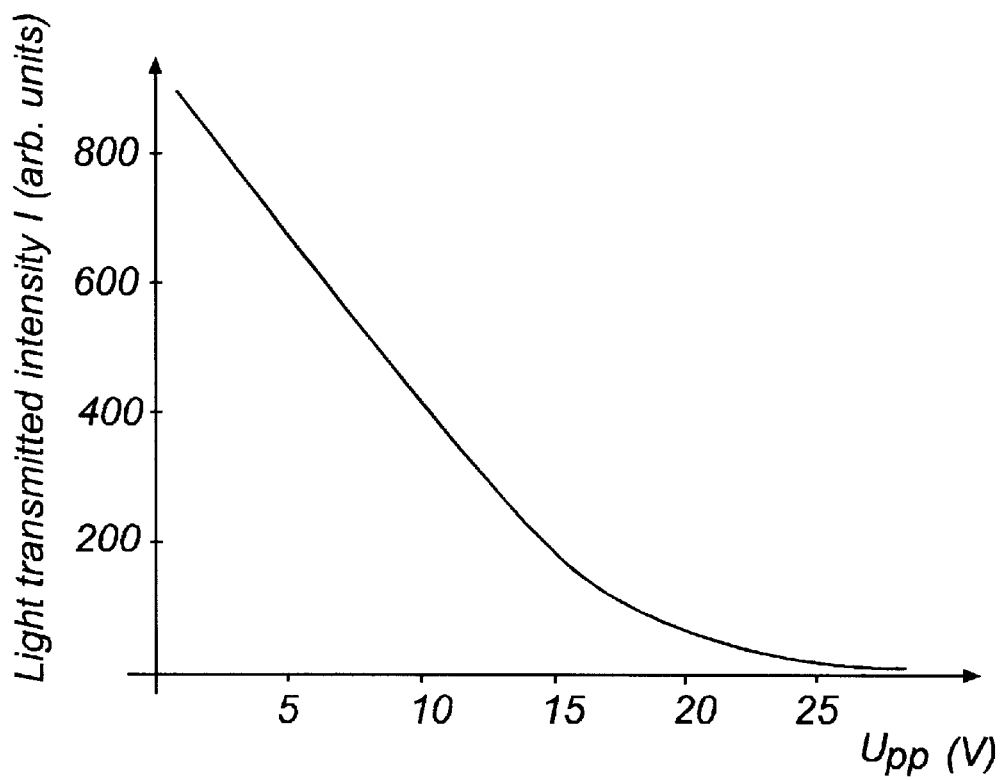
FIG. 7 illustrates the light transmission intensity I as a function of the applied voltage obtained by the device according to FIG. 6.

A cell 2 was prepared according to the above-described Example 2. The cell gap was filled with the following nematic mixture: 4-n-butyl-trans-cycloxane carboxylic acid 65 mol % 4-n-hexyl-trans-cyclohexane-carboxylic acid 35 mol %. This mixture is nematic from below −20° C. up to +90° C. Dε=0.07 ; Uthr=10.5 V. When applying a voltage of 5V, the device showed an in-plane switching (M1→M2) similar to the one described in example 5. However, no complete extinction of the light is achieved in position M2. When subsequently increasing the voltage further in a second steo, in this example to 15 V, another switching process was obtained (M2→M3), leading to complete extinction of the light, as illustrated by the diagram in FIG. 7). In this second switching step M2→M3, due to the small positive dielectric anisotropy of the mixture, the molecules of the nematic phase tend to orient perpendicular to the surface of the glass substrates 4 20 (homeotropic orientation).

When the cell gap is filled with a nematic liquid crystal 12, having a small positive dielectric anisotropy, and having a threshold voltage for dielectric switching above that of the chiral smectic surface layer mediated switching of the nematic, the device presents the above-described two switching steps. The first switching is reached at the threshold voltage of the chiral smectic mediated in-plane-switching, and the second switching step is obtained when the voltage exceeds the threshold of dieletric switching, leading to a homeotropic orientation of the nematic. Setting the polarizers suitably, the first step can extinguish the light partially, and the second step completely. This two step switching mode is useful for obtaining a grey scale.

EXAMPLE 8

Single-sided Embodiment

Figure 8:
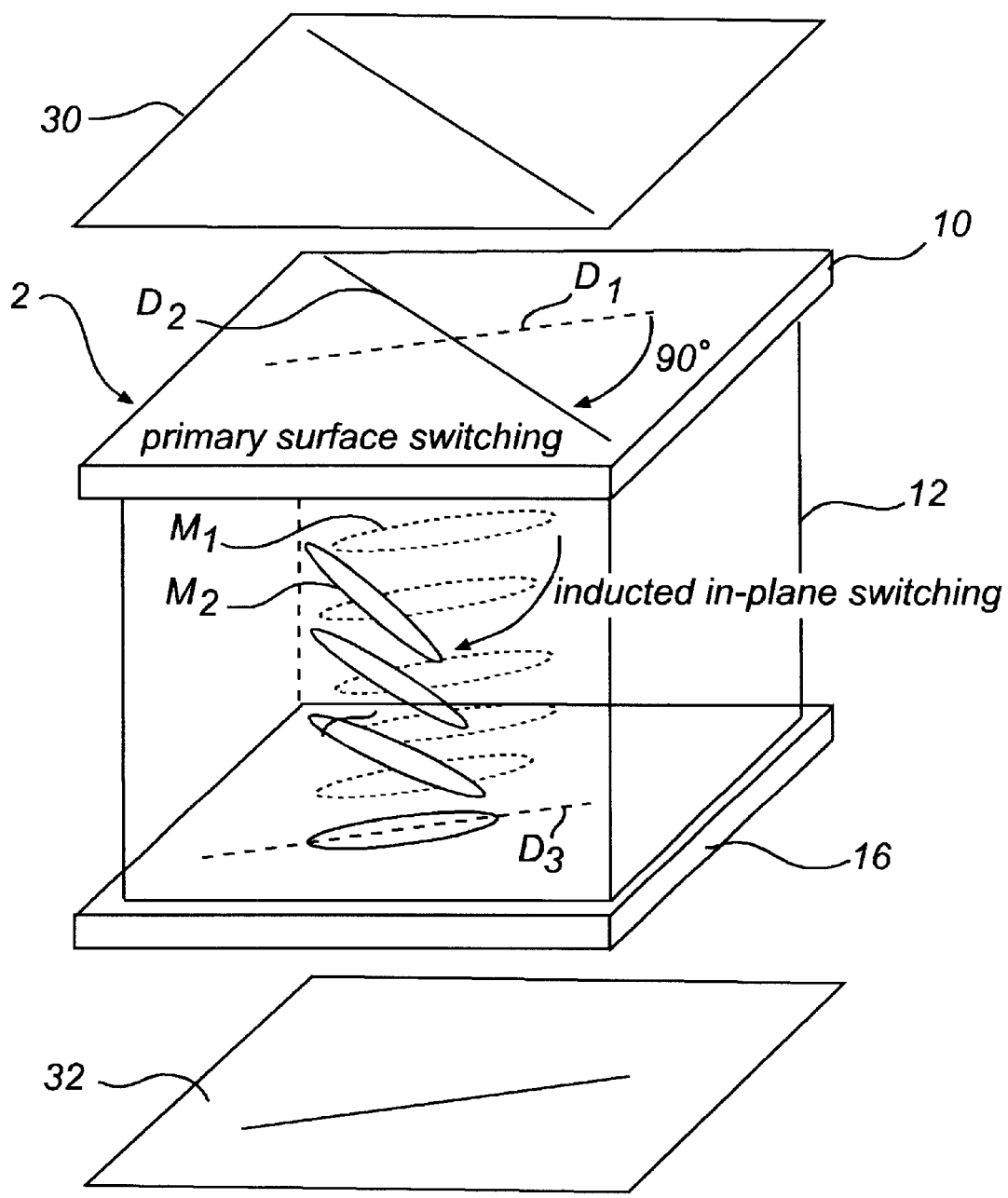
FIG. 8 is a schematic drawing illustrating a further example of an induced in-plane bulk switching.

Reference is now made to FIG. 8. A cell 2 according to FIG. 1b with only one (4) of the substrates covered with a chiral smectic layer, according to sample 1, was prepared. The surface coating exhibited a 90° primary switching (D1→D2). The other substrate 20 was covered with polyimide, undirectionally rubbed, resulting in a surface alignment direction D3 of the bulk molecules closest to the substrate 20. The cell gap was filled with a nematic mixture 12. In the off-state, the nematic is oriented homogeneously planar (M1). Setting the polarization plane of one (32) of the crossed polarizers 30, 32 parallel to the nematic director, the cell 2 extinguished the light at E=0. When applying a voltage of 5V, we obtained a 90° switching (D1→D2) of the preferred direction of alignment at the surface covered with the chiral smectic layer, which resulted in an induced 90° twist M1→M2 in the bulk 12. In this "on" state, the device 2 is light transmitting. By another suitable setting of the crossed polarizers 30, 32, the "off" state can be made transmissive instead.

EXAMPLE 9

Switching the Handedness of Circular Light

Figure 9:
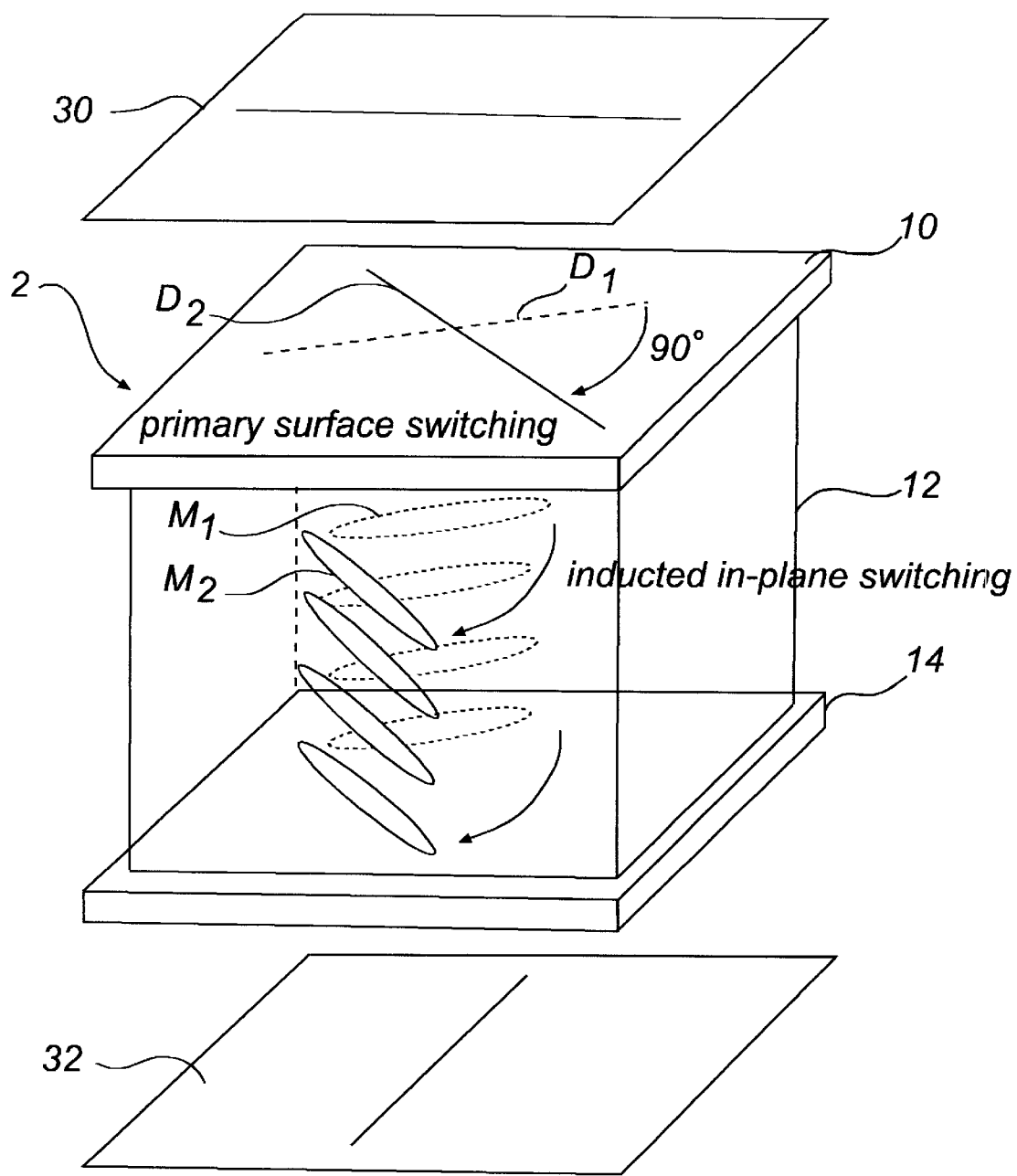
FIG. 9 is a schematic drawing illustrating a further example of an induced in-plane bulk switching.

Reference is now made to FIG. 9. The cell parameters were chosen in such a way to fulfil the λ/4 wave plate condition. The material for chiral surface coating was chosen to give a primary switching angle (D1→D2) of 90°. The cell was inserted between crossed polarizers with the switching states being symmetrically disposed about the transmission direction of the polarizer 30. Then, the handedness of the circularly polarized light at the output of the device depends on to the polarity of the applied electric field. In this way, a fast switch of the handedness of the circular light can be implemented.

EXAMPLE 10

Figure 10:
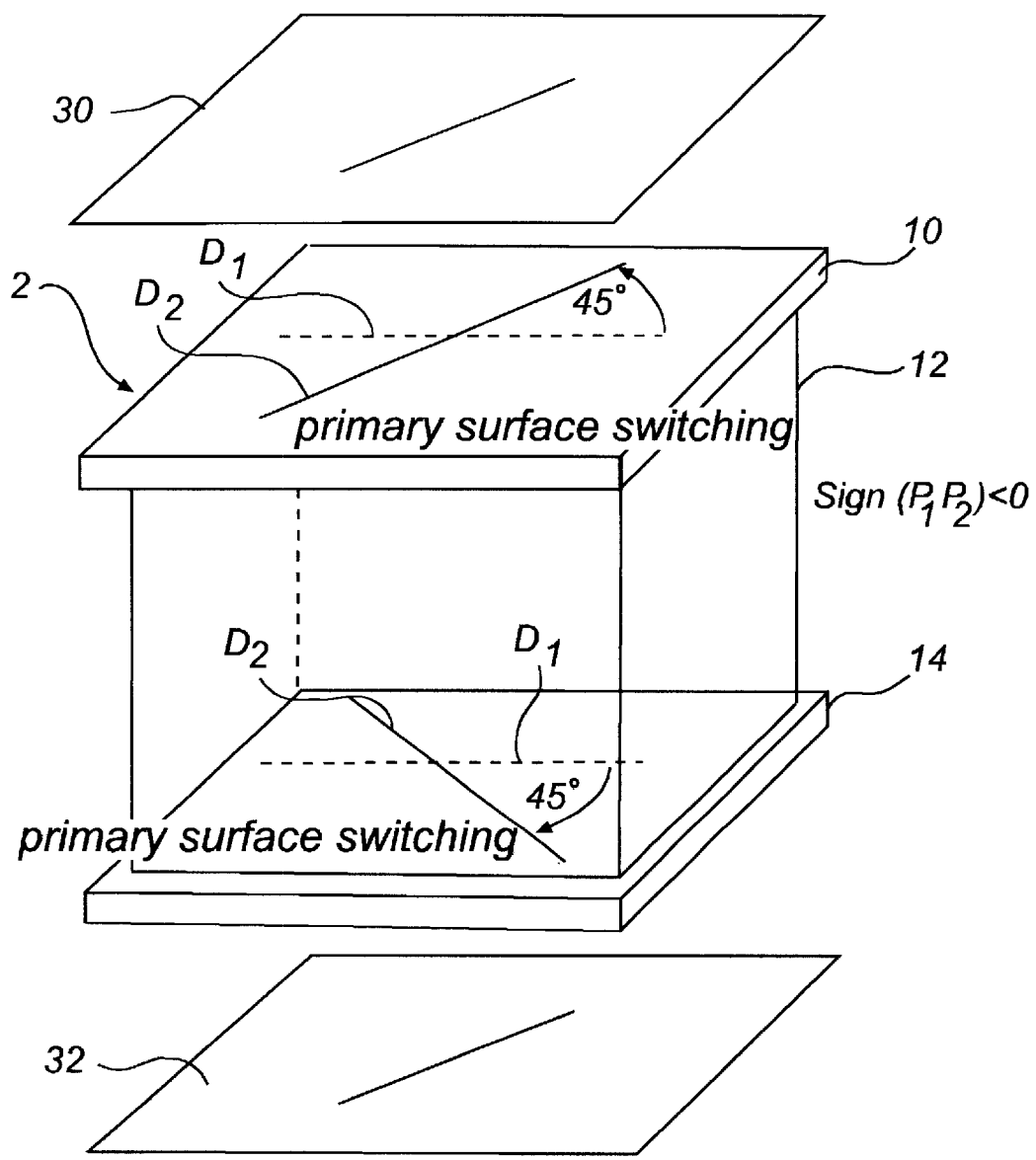
FIG. 10 is a schematic drawing illustrating a further of an induced in-plane bulk switching.

Reference is now made to FIG. 10. In this example, the first switchable layer 10 of the cell 2 included a erroelectric liquid crystal with a positive spontaneous polarization (Ps>0), whereas the second dynamic surface alignment layer 14 presented a negative spontaneous polarization (Ps<0). The device 2 was filled with a nematic material 12 aligned along a common axis. The device was placed between parallel polarizers 30 and 32.

The device optic axis was oriented at 45° with respect to the transmission direction of the polarizers 30, 32. If the angle of the primary switching of the surfaces is 45°, then, due to the opposite signs of the spontaneous polarization of the ferroelectric surface layers 10 and 14, the device will be switched between a transmissive (bright) non-twisted state and a non-transmissive (dark) twisted state on reversing the sign of the applied electric field.

EXAMPLE 11

In another example, the cell was prepared according to Example 10, but the liquid crystal in the bulk 12 was a non-chiral smectic C with a molecular tilt angle of 45 degrees. The electrooptical switching of this cell was similar to the one described in Example 10.

What is claimed is:

1. A liquid crystal device including:
    at least one confining substrate,
    a liquid crystal bulk layer presenting a surface director at a bulk surface thereof, wherein an orthogonal projection of said surface director on said substrate, termed projected surface director, presents a preferred orientation in a geometrical plane parallel to said substrate, termed preferred in-plane orientation, and a surface-director alignment layer arranged to interact with the bulk layer at said bulk surface, said surface-director alignment layer being a dynamic alignment layer directly controllable by an applied electric field to perform an in-plane switching in the dynamic alignment layer for accomplishing, as a direct consequence of this in-plane switching and the interaction at the bulk surface, an in-plane switching of said preferred in-plane orientation of the projected surface director.

2. A liquid crystal device as claimed in claim 1, wherein said dynamic surface alignment layer comprises a liquid crystal material.

3. A device as claimed in claim 2, wherein said liquid crystal material of the dynamic alignment layer includes a smectic liquid crystal material.

4. A device as claimed in claim 3, wherein said smectic liquid crystal material of the dynamic surface alignment layer presents smectic layers oriented non-parallel with said confining substrate.

5. A device as claimed in claim 4, wherein said smectic layers in the dynamic alignment layer are oriented in a quasi-bookshelf structure (QBS).

6. A device as claimed in claim 3, wherein said smectic liquid crystal material of the dynamic alignment layer includes a chiral smectic liquid crystal material.

7. A device as claimed in claim 6, wherein said chiral smectic liquid crystal material of the dynamic alignment layer includes a C* material.

8. A device as claimed in claim 6, wherein said chiral smectic liquid crystal material of the dynamic alignment layer includes an A* material.

9. A device as claimed in claim 2, further comprising a separate alignment layer interacting with the dynamic alignment layer for obtaining a preferred orientation of a surface director of said liquid crystal material of the dynamic alignment layer.

10. A device as claimed in claim 9, wherein said separate alignment layer is a non-dynamic alignment layer, such as an alignment layer produced by surface treatment of said confining substrate.

11. A device as claimed in claim 9, wherein said liquid crystal material of the dynamic alignment layer constitutes a liquid crystal layer which, during the manufacture of the device, has been deposited on the separate alignment layer before introducing the liquid crystal bulk layer into the device.

12. A device as claimed in claim 1, wherein said dynamic alignment layer is permanently attached to said confining substrate.

13. A device (2) as claimed in claim 1, wherein said dynamic surface alignment layer (10) is directly controllable by said electric field in a bistable manner.

14. A device as claimed in claim 1, wherein said dynamic alignment layer is directly controllable by said electric field in a multistable manner.

15. A device (2) as claimed in 1, wherein said dynamic surface alignment layer (10) is directly controllable by said electric field in an analogue manner.

16. A device as claimed in claim 1, wherein the response of said dynamic alignment layer to said electric field is ferroelectric, antiferroelectric or paraelectric.

17. A device as claimed in claim 1, wherein the dynamic alignment layer is produced by a material which is polymerizable by the application of UV light during the manufacture of the device.

18. A device as claimed in claim 1, wherein said dynamic alignment layer is non-soluble in the liquid crystal bulk layer.

19. A device as claimed in claim 1, wherein said dynamic alignment layer is produced from a polymer material, a oligomer material or a monomer material.

20. A device as claimed in claim 1, wherein the response of said liquid crystal bulk layer to said electric field is ferroelectric, antiferroelectric or paraelectric.

21. A device as claimed in claim 1, wherein the bulk layer comprises a liquid crystal material selected from the group comprising nematic liquid crystals, smectic liquid crystals and discotic liquid crystals.

22. A device (2) as claimed in claim 21, wherein the bulk layer (12) comprises a nematic liquid crystal material having a twisted configuration of an nematic director within said bulk layer (12).

23. A device as claimed in claim 21, wherein the bulk layer comprises a nematic liquid crystal material having a twisted configuration of an nematic director within said bulk layer.

24. A device (2) as claimed in claim 21, wherein the bulk layer (12) comprises a smectic liquid crystal material having a twisted configuration of a smectic director within said bulk layer (12).

25. A device (2) as claimed in claim 21, wherein the bulk layer (12) comprises a smectic liquid crystal material having a non-twisted configuration of a smectic director within said bulk layer (12).

26. A device (2) as claimed in claim 1, wherein said liquid crystal bulk layer (12) is confined between said dynamic surface alignment layer (10), which is arranged on a first side of the bulk layer (12), and a non-dynamic surface alignment layer (16) which is arranged on an opposite second side of the bulk layer (12).

27. A device as claimed in claim 1, further comprising, in addition to said first-mentioned dynamic surface-director alignment layer, a second dynamic surface-director alignment layer arranged such that said bulk layer is confined between said first-mentioned and said second dynamic alignment layers, which are directly controllable by a common electric field in such a way that said electric field interacts with both alignment layers for changing the preferred orientation of a projected surface director of the bulk layer at a first side thereof, as well as the preferred orientation of a projected surface director of the bulk layer at said second side thereof.

28. A device as claimed in claim 27, wherein the first-mentioned dynamic alignment layer presents a positive spontaneous polarisation (Ps>0), whereas the second dynamic alignment layer presents a negative spontaneous polarisation (Ps<0), 29. A device as claimed in claim 1, wherein said preferred orientation of the surface director of the bulk layer is parallel, or essentially parallel, to the dynamic alignment layer.

30. A device as claimed in claim 1, wherein also said liquid crystal bulk layer is directly controllable by said electric field, when the latter is applied over the dynamic alignment layer as well as over the liquid crystal bulk layer.

31. A device as claimed in claim 30, wherein the bulk layer is directly controllable by said electric field only if the field strength thereof exceeds a threshold value, whereas the dynamic alignment layer is directly controllable also for field strengths not exceeding said threshold value.

32. A device as claimed in claim 1, further comprising means, such as surface electrodes, for applying said electric field over the dynamic alignment layer.

33. A device as claimed in claim 32, wherein said means for applying the electric field are arranged such that the electric field is applied over said dynamic alignment layer as well as over said bulk layer.

34. A device as claimed in claim 32, wherein said means for applying the electric field comprises two intersecting electrode groups for producing a matrix addressed device.

35. A device according to claim 1, further comprising at least one polarizer for turning a directional switch of a director within the bulk liquid crystal into an optically visible effect.

36. A method for producing a liquid crystal device, comprising:
providing two confining substrates;
sandwiching a liquid crystal bulk layer between said two confining substrates, said bulk layer presenting a surface director at a bulk surface thereof, wherein an orthogonal projection of said surface director on said substrates, termed projected surface director, presents a preferred orientation in a geometrical plane parallel to said substrates, termed preferred in-plane orientation; and
providing a surface-director alignment layer on an inner surface of at least one of said substrates for interacting with the bulk layer at said bulk surface, said surface-director alignment layer being a dynamic alignment layer directly controllable by an applied electric field to perform an in-plane switching in the dynamic alignment layer for accomplishing, as a direct consequence of this in-plane switching and the interaction at the bulk surface, an in-plane switching of said preferred in-plane orientation of the projected surface director.

37. A method as claimed in claim 36, wherein the dynamic alignment layer is provided by coating said inner surface with a liquid crystal material.

38. A method as claimed in claim 36, wherein a chiral smectic liquid crystal is used for producing said dynamic alignment layer.

39. A method as claimed in claim 38, wherein said chiral smectic liquid crystal is arranged in a quasi-bookshelf geometry.

40. A method as claimed in claim 38, wherein the chiral smectic liquid crystal is polymerized by action of ultraviolet light.

41. A method as claimed in claim 38, wherein the chiral smectic liquid crystal is polymerized by action of temperature.

42. A method as claimed in claim 38, wherein the chiral smectic liquid crystal is attached permanently to the substrate.

43. A method as claimed in claim 36, wherein the dynamic alignment layer is provided by:
coating said inner surface with a material, which is photoreactive, in the sense that molecules within said material can be aligned by light, as well as polymerizable;
aligning said molecules within said material in a preferred direction by subjecting the material to light; and
subjecting the thus aligned material to a polymerization, whereby said polymerized material forms said dynamic alignment layer.

44. A method for accomplishing an in-plane switching in a liquid crystal bulk layer of a liquid crystal device, comprising:
providing, in contact with said bulk layer, a dynamic surface-director alignment layer which is controllable by an electric field and which interacts with said bulk layer; and
applying an electric field over said dynamic alignment layer in order to produce an in-plane directional change in the dynamic alignment layer and, thereby, a primary in-plane switching of a surface director of the bulk layer, said primary switching producing in its turn an induced in-plane bulk switching within the bulk layer.

45. A liquid crystal device including:
at least one confining substrate,
a liquid crystal bulk layer presenting a surface director at a bulk surface; and
a surface-director alignment layer, which is permanently attached to said confining substrate and thereby insoluble in the bulk layer and which is arranged to interact with the bulk layer at said bulk surface,
said surface-director alignment layer being a dynamic alignment layer directly controllable by an applied electric field to perform a switching in the dynamic alignment layer for accomplishing, as a direct consequence of this switching and the interaction at said bulk surface, a switching of said surface director of the bulk layer.

46. A liquid crystal device including:
at least one confining substrate,
a liquid crystal bulk layer presenting a surface director at a bulk surface; and
a surface-director alignment layer, which comprises a chiral smectic liquid crystal material and which is arranged to interact with the bulk layer at said bulk surface,
said surface-director alignment layer being a dynamic alignment layer directly controllable by an applied electric field to perform a switching in the dynamic alignment layer for accomplishing, as a direct consequence of this switching and the interaction at said bulk surface, a switching of said surface director of the bulk layer.

* * * * *